(12) United States Patent
Kaku

(10) Patent No.: US 7,123,554 B2
(45) Date of Patent: Oct. 17, 2006

(54) DISK APPARATUS

(75) Inventor: Junya Kaku, Itami (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 350 days.

(21) Appl. No.: 09/951,524

(22) Filed: Sep. 14, 2001

(65) Prior Publication Data

US 2002/0034141 A1 Mar. 21, 2002

(30) Foreign Application Priority Data

Sep. 18, 2000 (JP) .................................... 2000-281219

(51) Int. Cl.
*G11B 7/00* (2006.01)

(52) U.S. Cl. .................... 369/47.1; 369/53.1; 369/30.4; 369/30.64

(58) Field of Classification Search ................ 369/47.1, 369/47.36, 47.39, 53.1, 53.24, 53.45, 59.1, 369/59.14, 30.03, 30.04, 30.06, 30.32, 30.4, 369/30.51, 30.64, 30.7

See application file for complete search history.

(56) References Cited

U.S. PATENT DOCUMENTS

| 4,825,324 A | 4/1989 | Miyake et al. ............. 360/35.1 |
| 5,053,898 A | 10/1991 | Hashimoto et al. ........ 360/72.1 |
| 5,450,255 A | 9/1995 | Arisaka ..................... 360/72.1 |
| 5,485,442 A * | 1/1996 | Furukawa et al. ....... 369/47.21 |
| 5,761,167 A * | 6/1998 | Kim et al. ................ 369/30.32 |
| 5,892,738 A * | 4/1999 | Hirao et al. .............. 369/30.32 |

FOREIGN PATENT DOCUMENTS

| CN | 126418 | 8/2000 |
| EP | 0 823 816 A2 | 2/1998 |
| EP | 0 823 816 A3 | 4/1999 |
| JP | 54-136241 | 10/1979 |
| JP | 59-71102 | 4/1984 |
| JP | 62-170066 | 7/1987 |
| JP | 62-172560 | 7/1987 |
| JP | 62-273660 | 11/1987 |
| JP | 3-276457 | 12/1991 |
| JP | 3-288363 | 12/1991 |
| JP | 4-67468 | 3/1992 |
| JP | 4-105269 | 4/1992 |
| JP | 10-011755 | 1/1998 |
| JP | 11-110917 | 4/1999 |
| JP | 2000-066947 | 3/2000 |

* cited by examiner

*Primary Examiner*—Muhammad Edun
(74) *Attorney, Agent, or Firm*—Westerman, Hattori, Daniels & Adrian, LLP

(57) ABSTRACT

A disk apparatus includes a slot. A magnetooptical disk is attached to the slot. When the slot is closed, a system controller inputs a corresponding signal to a CPU. The CPU applies a read-out command of disk information to the disk controller. The disk controller drives a spindle motor, an optical pick-up and a recording head in order to read-out vacant capacity information from the magnetooptical disk. The read-out vacant capacity information is sent back to the CPU, and then saved in a flash memory by the CPU.

16 Claims, 5 Drawing Sheets

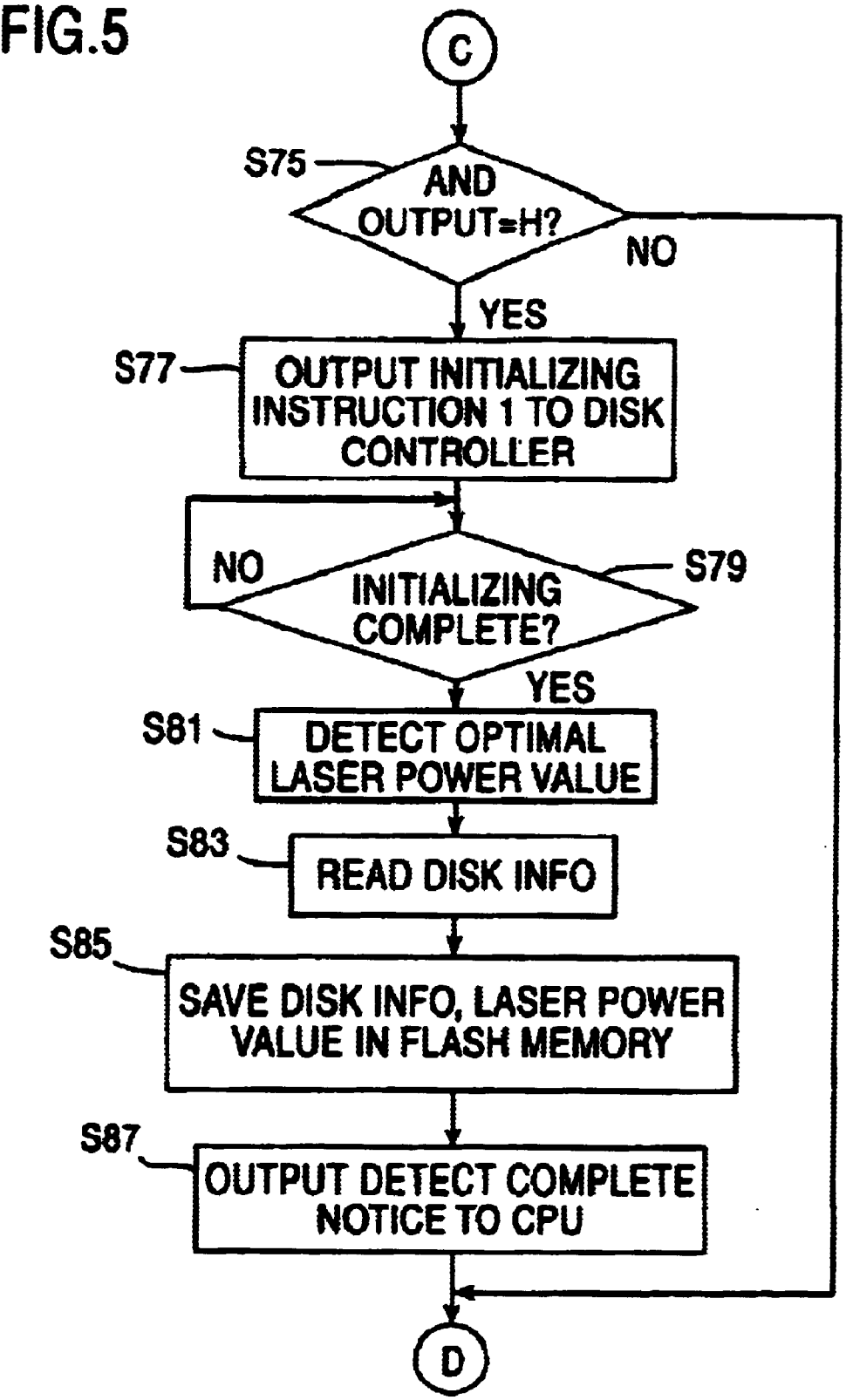

DISK APPARATUS

BACKGROUND OF THE INVENTION

1. Field of the Invention

The present invention relates to a disk apparatus. More specifically, the present invention relates to a disk apparatus which is applied to a digital camera, for example, and records a desired signal on the disk recording medium removably attached to the digital camera by exposing a laser beam to the disk recording medium.

2. Description of the Prior Art

In a case that an image signal of a captured object is recorded in a recording medium in accordance with an FAT scheme, recording states of each image signal (recording size, recording address, vacant capacity, etc.) are managed by FAT information (disk information). Due to this, in conventional digital cameras, the FAT information was reproduced from the recording medium in response to a power supply, and then a capturing control of the object was performed on the basis of vacant capacity information included in the reproduced FAT information. That is, in order to validate a shutter button operation, first, it is needed to confirm that the number of images capable of capturing is greater than one by detecting a vacant capacity. In the prior art, the FAT information was reproduced from the recording medium in response to the power supply.

However, in a case that a disk recording medium such as a magnetooptical disk is adopted as the recording medium, there is a need to drive a spindle motor, to move an optical pick-up to an FAT area, and then to expose a laser beam to the disk recording medium. Due to this, it took more than ten seconds to determine whether or not it is possible to take a picture in the disk recording medium.

SUMMARY OF THE INVENTION

Therefore, a primary object of the present invention is to provide a novel disk apparatus.

Another object of the present invention is to provide a disk apparatus capable of promptly determining whether or not to fetch a desired signal.

According to the present invention, a disk device which records a desired signal in a disk recording medium, comprises: an attaching means for detachably attaching the disk recording means; a first changing means for changing to a power-on state when the disk recording means is attached in a power-off state; a detecting means for detecting vacant capacity information showing a vacant capacity of the disk recording means from the disk recording means when changing to the power-on state by the first changing means; a saving means for saving the vacant capacity information detected by the detecting means in a semiconductor memory; and a controlling means for controlling a fetching of the desired signal on the basis of the vacant capacity information saved in the semiconductor memory.

If the disk recording means is attached to the attaching means in the power-off state, the power-off-state is changed to the power-on state by the first changing means. The detecting means detects the vacant capacity information showing a vacant capacity of the disk recording means from the disk recording means when changing to the power-on state by the first change means. The detected vacant capacity information is saved in the semiconductor memory by the saving means. A fetching of the desired signal is controlled by the controlling means on the basis of the vacant capacity information saved in the semiconductor memory.

It becomes possible to promptly determine whether or not to fetch the desired signal because it is possible to read the vacant capacity information from the semiconductor memory in a shorter time than from the disk recording means.

In one aspect of the present invention, if a power supply instruction is applied, the power-off-state is changed to the power-on state by the second changing means. The controlling means is activated by an activating means when changed to the power-on state by the second changing means. That is, a detect/save of the vacant capacity information is performed in response to the attaching of the disk recording means. In contrast, the control of the desired signal fetching is performed in response to the power supply instruction.

In another aspect of the present invention, when a fetching instruction is applied, the desired signal is fetched by the fetching means. Furthermore, the controlling means includes an invalidating means for invalidating the fetching instruction on the basis of the vacant capacity information. In a case of an image signal in which maximum size of the desired signal is determined in advance, the invalidating means invalidates the fetching instruction when the vacant capacity shown by the vacant capacity information is less than the maximum size.

In still another aspect of the present invention, if the vacant capacity information is saved in the semiconductor memory by the saving means, the power-on state is changed to the power-off state by a third changing means. Due to this, an amount of consumed electricity is curbed.

It is noted that the semiconductor memory is preferably non-volatile.

According to the present invention, a recording method which records the desired signal in the detachable disk recording means comprises steps of :(a) changing to a power-on state when the disk recording means is attached in the power-off state; (b) detecting the vacant capacity information showing a vacant capacity of the disk recording means when changing to the power-on state in the step(a); (c) saving the vacant capacity information detected in the step (b) in the semiconductor memory; and (d) controlling a fetching of the desired signal on the basis of the vacant capacity information saved in the semiconductor memory.

It is possible to read the vacant capacity information from the semiconductor memory in a shorter time than from the disk recording means. This thus enables to promptly determine whether or not to fetch the desired signal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart showing still another part of the operation of the CPU.

DETAILED DESCRIPTION OF THE PREFERRED EMBODIMENTS

Figure 1:
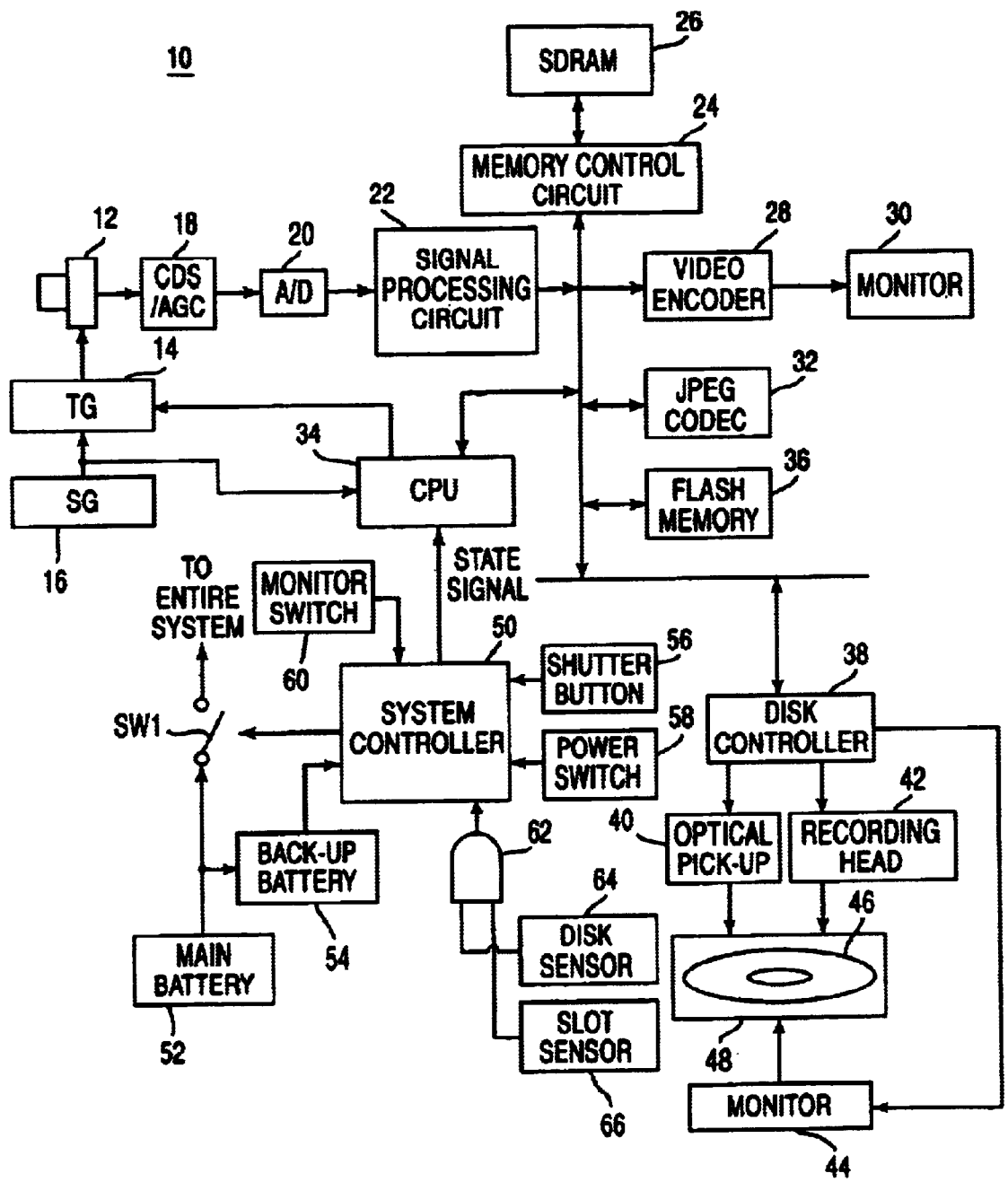
FIG. 1 is a block diagram showing one embodiment of the present invention.

Referring to FIG. 1, a digital camera 10 in this embodiment includes a battery 52. The battery 52 recharges a back-up power source 54, and a system controller 50 is uninterruptedly rendered on-state by the back-up power source 54.

When an operator turns on a power switch 58, the system controller 50 turns on a switch SW1 and applies to a CPU 34 a state signal indicating that the power switch 58 is on-state. If the operator converts the power switch 58 from on-state to off-state, the system controller 50 outputs a corresponding state signal to the CPU 34, and then turns off the switch SW1 after a predetermined time lapse.

Even if the power switch 58 is off-state, when an output level of an AND gate 62 changes from low-level to high-level, the system controller 50 turns on the switch SW1, and outputs to the CPU 34 a state signal indicating that the output level of the AND gate 62 is high-level. A disk censor 64 outputs a high-level signal when a detachable magnetooptical disk 46 is set to a slot 48, and a slot censor 66 outputs a high-level signal when the slot 48 changes from open-state to close-state. Since the AND gate 62 subjects the outputs of the disk censor 64 and the slot censor 66 to the AND processing, when the magnetooptical disk 46 is attached, in other words when the magnetooptical disk 46 is set to the slot 48 and the slot 48 changes to close-state, a state signal indicating that the output of the AND gate 62 is high-level is applied to the CPU 34. If a detection completion notice is applied from the CPU 34 after such the state signal is outputted, the system controller 50 returns the switch SW1 to off-state.

Also the system controller 50 outputs to the CPU 34 a state signal indicating on/off-state of a monitor switch 60 when the monitor switch 60 is converted. Furthermore, when a shutter button 56 is operated, the system controller 50 outputs to the CPU 34 a state signal indicating the shutter button 56 is on-state.

When the switch SW1 is turned on, power is supplied to an entire system including the CPU 34. When the switch SW1 is turned off, the power supply to the entire system is stopped. The CPU 34 started-up by the power supply determines the state signal applied by the system controller 50, and performs processes according to a determination result.

When the state signal indicates that the output of the AND gate 62 is updated from low-level to high-level is applied, the CPU 34 outputs an initializing instruction 1 to the disk controller 38. The disk controller 38 rotates the magnetooptical disk 46 by the spindle motor 44, and drives an optical pick-up 40 and a recording head 42, so as to subject the magnetooptical disk 46 to a test write and a test read. The test write and the test read are repeatedly carried out by a different laser beam power, therefore, an optimum laser beam power value is specified. When the optimum laser beam power value is specified, the disk controller 38 informs the CPU 34 that the initialization is complete.

Responding to the initializing completion notice, the CPU 34 requests the disk controller 38 for the optimum laser beam power value and the disk information (vacant capacity information of the magnetooptical disk 46, a maximum file number of the recorded image files, and etc.). Responding to the request, the disk controller 38 sends back to the CPU 34 the optimal laser beam power value specified by the above described test write and the test read and the disk information read from an FAT (File Allocation Table) area of the magnetooptical disk 46. The CPU 34 records the sent back optimal laser beam power value and the disk information in a flash memory 36. When the recording process is complete, the CPU 34 outputs a detection completion notice to the system controller 50. As described above, the system controller 50 turns off the switch SW1 responding to the detection completion notice.

When a state signal indicating that the power switch 58 is turned on is applied, the CPU 34 reads the disk information from the flash memory 36, and performs a configuration setting for photographing on the basis of the read disk information. As described above, the disk information includes the vacant capacity information of the magnetooptical disk 46 and the maximum file number of the recorded image files, etc. The CPU 34 calculates the number of images capable of photographing on the basis of the vacant capacity information, and determines the file number of a still image file created next time on the basis of the maximum file number.

When the photographing configuration setting is complete, the CPU 34 reads the optimal laser beam power value from the flash memory 36, and applies the read optimal laser beam power value and an initializing instruction 2 to the disk controller 38. The disk controller 38 subjects the magnetooptical disk 46 to a simple test write and test read on the basis of the optimal laser beam power value. That is, it is determined whether or not a recording process appropriately performs by the applied optimal laser beam power value. Subsequently, if the appropriate recording process is possible, the supplied optimal laser beam power value is determined as an optimal laser beam power value of the currently attached magnetooptical disk 46. In the meantime, if the appropriate recording process is impossible, an optimal laser beam power value is determined by carrying out a strict test write and a test read, that is, a plurality of test writes and test reads by different laser beam powers. When the optimal laser beam power value is determined in this manner, the initializing completion notice is outputted to the CPU 34.

When a state signal indicating the monitor switch 60 is turned on is applied, the CPU 34 performs a through image display process. More specifically, the CPU 34 outputs a thinning-out read command to a timing generator (TG) 14, and in addition outputs a predetermined process command to a signal processing circuit 22 and a video encoder 28.

The timing generator (TG) 14 drives a CCD imager 12 in accordance with a thinning-out read scheme on the basis of a vertical synchronization signal and a horizontal synchronization signal outputted from a single generator (SG) 16. Due to this, a low-resolution camera signal (pixel signal) corresponding to an object image is outputted from the CCD imager 12. The outputted camera signal is subjected to a well-known noise reduction and a level control in a CDS/AGC circuit 18, and subsequently converted to a digital signal by an A/D converter 20.

The signal processing circuit 22 subjects a camera data applied through the A/D converter 20 to a color separation, a white balance control, a YUV conversion and so on so as to generate a YUV data corresponding to the object image, and outputs the generated YUV data and a write request to the memory control circuit 24. The YUV data outputted from the signal processing circuit 22 is written in an SDRAM 26 by the memory control circuit 24. In the meantime, the video encoder 28 requests the memory control circuit 24 to read out the YUV data, and converts the YUV data read by the memory control circuit 24 into a composite video signal in accordance with an NTSC scheme. The converted composite video signal is applied to the monitor 30. As a result, a real-time moving image of the object, i.e. a through image is displayed on the monitor 30.

When a state signal indicating the monitor switch 60 is turned off is applied, the CPU 34 outputs a cancel command of the thinning-out read to the TG 14, and also outputs a process cancel command to the signal processing circuit 22 and to the video encoder 28. Due to this, a through image display is cancelled.

When a state signal is indicating that the shutter button 56 is operated is applied, the CPU 34 determines the number of images capable of photographing, and validates an operation of the shutter button 56 only when it is possible to take more than one picture. In other words, responding to the applied state signal, the CPU 34 requests the TG 14 to read the entire pixels, outputs to the signal processing circuit 22 the same process command as above and outputs a compression command to a JPEG CODEC 32.

The TG 14 drives the CCD imager 12 during a one-frame period in accordance with an entire pixel read scheme on the basis of the vertical synchronization signal and the horizontal synchronization signal. A high-resolution camera signal corresponding to the object image is outputted from the CCD imager 12. The outputted one-frame camera signal is subjected to the same process as above, and a high-resolution YUV data is outputted from the signal processing circuit 22. The outputted YUV data is written into the SDRAM 26 by the memory control circuit 24.

Corresponding to a compression command from the CPU 34, the JPEG CODEC 32 requests the memory control circuit 24 to read the YUV data. The memory control circuit 24 reads the high-resolution YUV data from the SDRAM 26 corresponding to the read request, and the JPEG CODEC 32 subjects the read YUV data to a JPEG compression. Due to this, a compression still image data compressed not exceeding a maximum size of 20 K bytes is generated. The JPEG CODEC 32 applies the generated compression still image data and a write request to the memory control circuit 24. Due to this, the compression still image data is also stored in the SDRAM 26 by the memory control circuit 24.

If the compression still image data is obtained in the SDRAM 26, the CPU 34 requests by itself the memory control circuit 24 to read the compression still image data, and applies the read compression still image data to the disk controller 38. The CPU 34 also generates a file name including the file number determined when the power switch 58 is turned on, and applies the generated file name to the disk controller 38 following the compression still image data.

When the compression still image data and the file name are applied, the disk controller 38 drives the optical pick-up 40 and the recording head 42, and records the still image file including the compression still image data and the file name to the magnetooptical disk 46 in accordance with the FAT scheme.

When a state signal indicating the power switch 58 is turned off, the CPU 34 requests the optimal laser beam power value and the disk information to the disk controller 38. At this time, the disk controller 38 sends back to the CPU 34 the optimal laser beam power value determined by the test read and the test write based on the initializing instruction 2 and the current disk information. The CPU 34 records the sent back optimal laser beam power value and the disk information in the flash memory 36.

Figure 2:
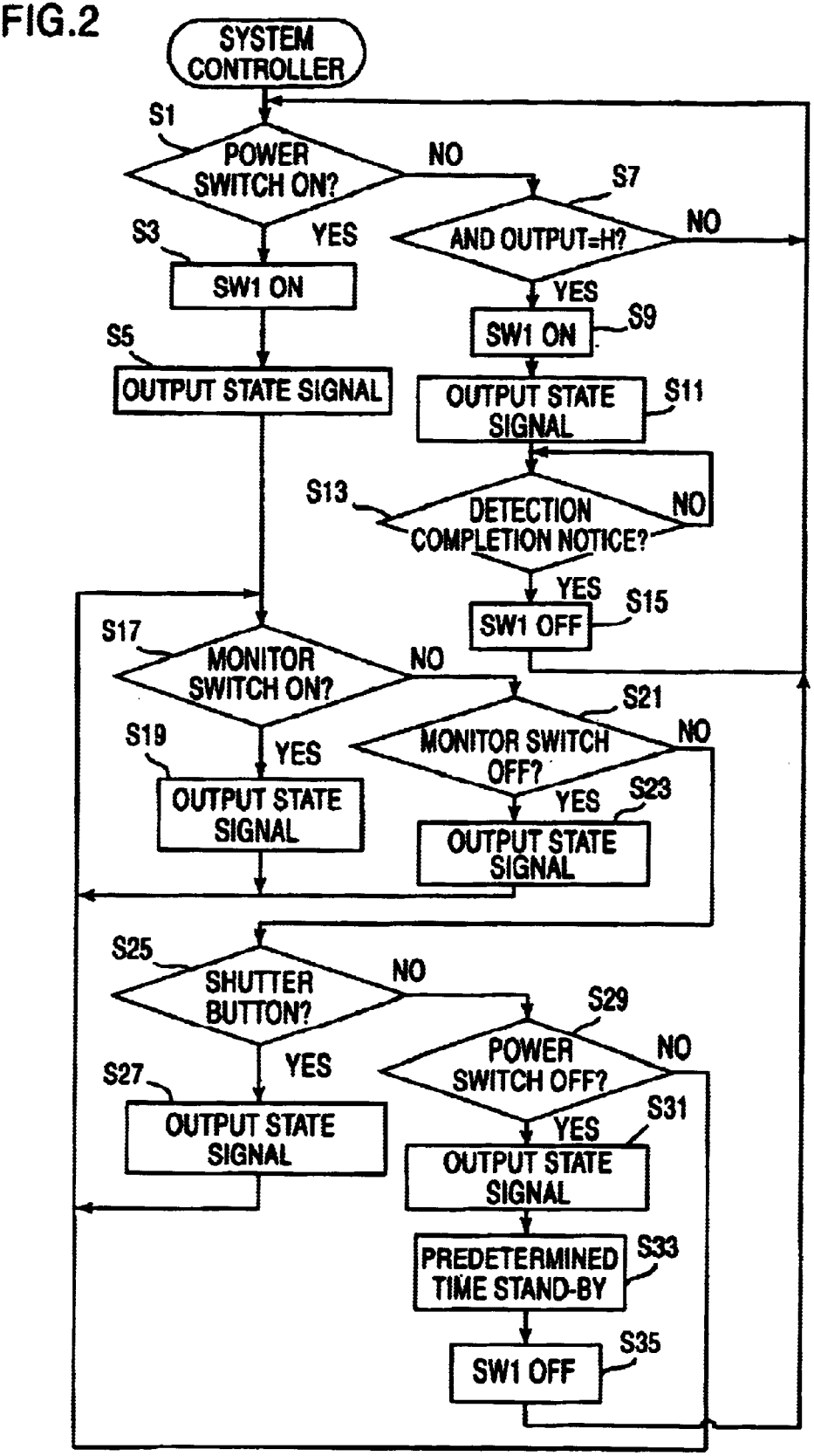
FIG. 2 is a flowchart showing an operation of a system controller.

The system controller 50, more specifically, processes flowchart shown in FIG. 2. First it is determined whether or not the power switch 58 is turned on in a step S1. When the power switch 58 is changed from off-state to on-state, the switch SW1 is turned on in a step S3, and a state signal indicating that the power switch 58 is turned on is outputted to the CPU 34 in a step S5.

Then, a state of the monitor switch 60 is determined in respective steps of S 17 and S 21. When the monitor switch 60 is changed from off-state to on-state YES is determined in the step S17, and a state signal indicating that the monitor switch 60 has moved to on-state is outputted to the CPU 34 in a step S19. On the other hand, when the monitor switch 60 is changed from on-state to off-state, YES is determined in the step S21, and a state signal indicating that the monitor switch 60 has moved to off-state is outputted to the CPU 34 in a step S23.

If NO in either step S17 or S21, it is determined whether or not the shutter button 56 is operated in a step S25, and it is determined whether or not the power switch 58 is turned off in a step S29. If the shutter button 56 is operated, the process proceeds from the step S25 to a step S27, a state signal indicating that the shutter button 56 is operated is outputted to the CPU 34. In the meanwhile, if the power switch 58 is changed from on-state to off-state, the process proceeds from the step S29 to a step S31, and a state signal indicating that the power switch 58 is turned off is outputted to the CPU 34. Furthermore, after a lapse of a predetermined time period of stand-by in a step S33, the switch SW1 is turned off in a step S35. If the process of the step S 27 is complete or NO is determined in either the step S25 or the step S29, the process returns to the step S17. When a process of the step S35 is complete, the process returns to the step S1.

If an output of the AND gate 62 changes from low-level to high-level when the power switch 58 is off-state, No is determined in the step S1, and YES is determined in a step S7. The switch SW1 is then turned on in a step S9, and a state signal indicating that the output of the AND gate 62 is high level is outputted to the CPU 34 in a step S11. It is determined whether or not the detection completion notice is sent back from the CPU 34 in a step S13, and if YES, the switch SW1 is turned off in a step S15. When the process of the step S15 is complete, the process returns to the step S1.

Figure 3:
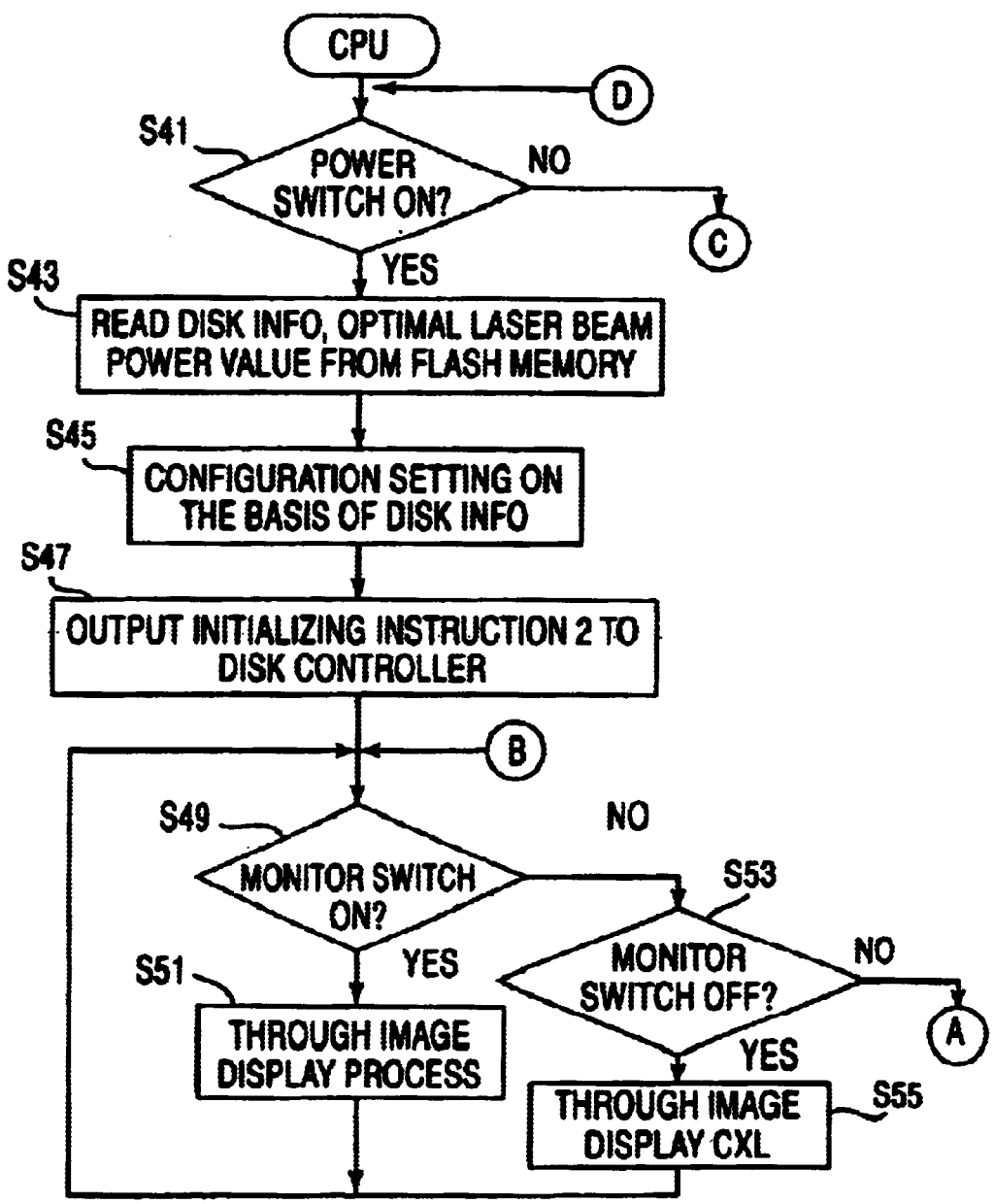
FIG. 3 is a flowchart showing one part of an operation of a CPU.
Figure 4:
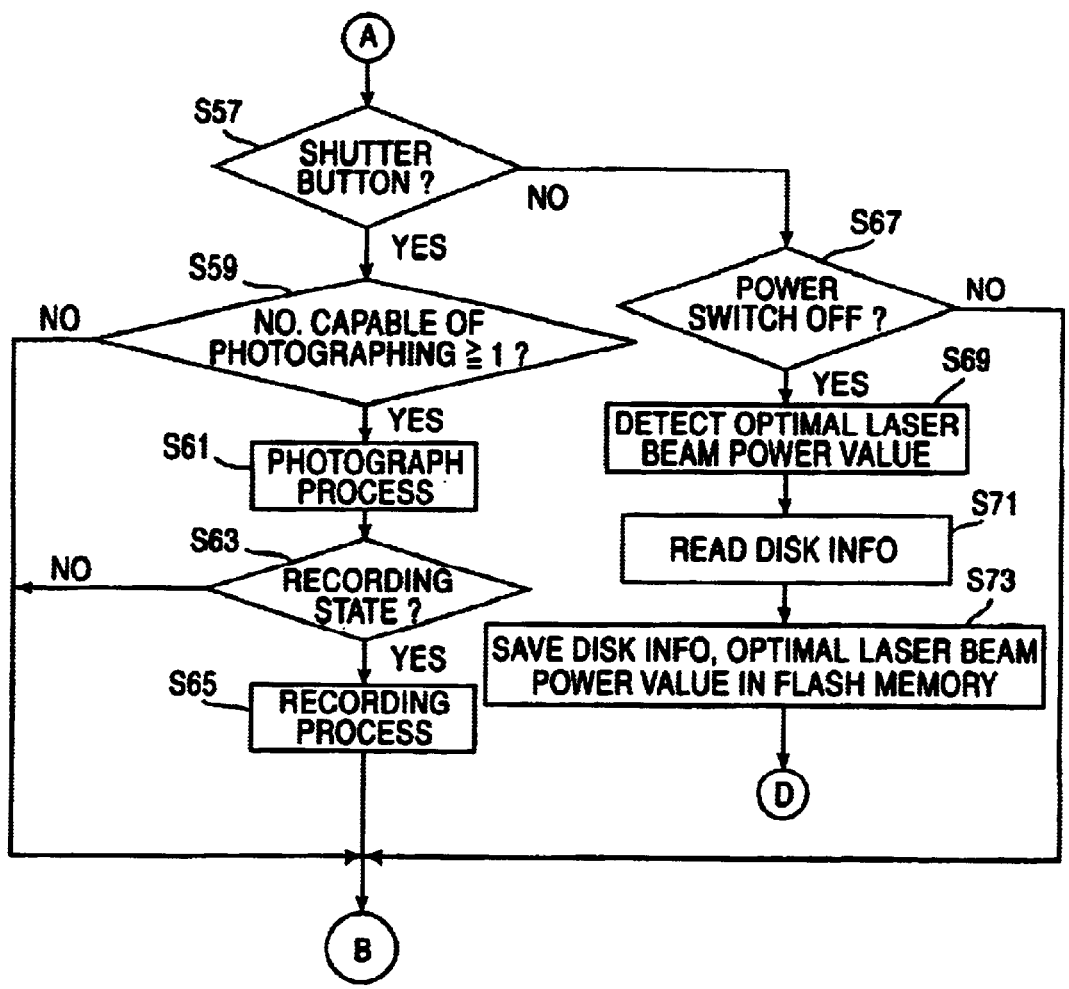
FIG. 4 is a flowchart showing another part of the operation of the CPU.

More specifically, the CPU 34 processes flowcharts shown in FIG. 3 to FIG. 5. First, it is determined whether or not the power switch 58 is turned on on the basis of the state signal from the system controller 50 in a step S41. If YES, the disk information and the optimal laser beam power value are read from the flash memory 36 in a step S43. A photographing configuration setting (a calculation of the number of images capable of photographing, a determination of a file number of still image files to be created next time, etc.) is carried out on the basis of the read disk information in a step S45, the read optimal laser beam power value and the initializing instruction 2 are outputted to the disk controller 38 in a following step S47. The optimal laser beam power value of the currently attached magnetooptical disk 34 is determined by the initializing instruction 2.

It is determined whether or not the monitor switch 60 is turned on in a step S49, and it is determined whether or not the monitor switch 60 is turned off in a step S53. These determinations are also made on the basis of the state signal from the system controller 50 in a same manner as described in the step S41. If YES in the step S49, a through image display process is carried out in a step S51. More specifically, a thinning-out read command is applied to the TG 14, and a predetermined process command is applied to the signal processing circuit 22 and the video encoder 28. As a result, the through image is displayed on the monitor 30. On the other hand, if YES in the step S53, the through image display is cancelled in a step S55. More specifically, TG 14, the signal processing circuit 22 and the video encoder 28 are disabled. When processes of the steps S51 and S55 are complete, the process returns to the step S49.

In a step S57 shown in FIG. 4, it is determined whether or not the shutter button 56 is operated on the basis of the state signal from the system controller 50. Herein, if YES, it is determined whether or not the number of images capable of photographing is greater than "one" in a step S59. If NO, the process returns to the step S49 without going through processes of steps S61 to S65. Due to this, the operation of the shutter button 56 is invalidated.

On the other hand, if the number of images capable of photographing is greater "one", a still image photographing process is performed in the step S61. More specifically, a command of an entire pixel reading a one frame period is applied to the TG 14, a predetermined process command is applied to the signal processing circuit 22, and then a compression command is applied to the JPEG CODEC 32. Furthermore, the number of images capable of photographing and the file numbers are updated. A one-frame compression still image data is obtained in the SDRAM 26 secured by the photographing process.

It is determined whether or not the magnetooptical disk 46 is in a recording-capable state in a following step S63. The recording-capable state is a state that the optimal laser beam power is set to the optical pick-up 40, and the spindle motor 44 rotates at a predetermined speed. The recording-capable state is obtained when the initializing completion notice is sent back from the disk controller 38 responding to the above initializing instruction 2, or when a rotation of the spindle motor 44 is resumed for a recording process from the state that the rotation of the spindle motor 44 is provisionally interrupted for a reduction in electric power consumption.

If such the recording-capable state is not obtained, the process returns from the step S63 to the step S49. However, if the recording-capable state is obtained, the process returns to the step S49 after performing a recording process in the step S65. In the recording process the compression still image data is read from the SDRAM 26 through the memory control circuit 24, and the read compression still image data and a file name voluntarily generated are applied to the disk controller 38. As a result, the still image file including the compression still image data and the file name is recorded in the magnetooptical disk 46 by the optical pick-up 40 and the recording head 42.

In a step S67, it is determined whether or not the power switch 58 is turned off on the basis of the state signal from the system controller 50. Herein, if YES, the optimal laser beam power value and the disk information are detected through the disk controller 38 in respective steps S69 and S71. More specifically, the optimal laser beam power value determined in the disk controller 38 on the basis of the above initializing instruction 2 is detected in the step S69, and the current disk information is read in the step S71. In a following step S73 the optimal laser beam power value and the disk information thus obtained are stored in the flash memory 36, and the process returns to step S41 upon completing a process of the step S73.

Although not shown in FIG. 3, if the compression still image data remains in the SDRAM 26 at a time when the power switch 58 is turned off, the same recording process as in the step S65 is performed prior to the step S69.

If NO is determined in the step S41, the process proceeds to a step S75 shown in FIG. 5, it is determined whether or not the output of the AND gate 62 changes from low-level to high-level. This determination is also made on the basis of the state signal from the system controller 50. Herein, if YES, the initializing instruction 1 is applied to the disk controller 38 in a step S77. By the initializing instruction 1, the test read and test write are repeatedly performed by different laser beam powers, and the optimal laser beam power value is determined.

When the initializing completion notice is issued from the disk controller 38 after the optimal laser beam power value is determined, YES is determined in a step S79, and the optimal laser beam power value and the disk information are detected through the disk controller 38 in respective steps S81 and S83. That is, the optimal laser beam power value determined on the basis of the initializing instruction 1 is detected in the step S81, and the current disk information is read from the magnetooptical disk 46 in the step S83. The optimal laser beam power value and the disk information thus obtained are stored in the flash memory 36 in a step S85, and the detection completion notice is outputted to the system controller 50 in a following step S87. Upon completing the step S87, the process returns to the step S41.

As understood from the above descriptions, the digital camera 10 is driven by a battery power, and records the still image file by the optical pick-up 40 and the recording head 42 in the magnetooptical disk 46 rotated by the spindle motor 44. Herein, the magnetooptical disk 46 is detachably attached by the slot 48. When the magnetooptical disk 46 is attached to the slot 48 while the battery 52 is off-state the battery 52 is turned on by the system controller 50.

The CPU 34 reads the disk information including the vacant capacity information of the magnetooptical disk 46 after the battery 52 is turned on, and saves the read disk information in the flash memory 36. Upon completion of saving the disk information, the battery 52 is turned off by the system controller 50.

When the power switch 58 is turned on, the CPU 34 reads the vacant capacity information from the flash memory 36, and calculates the number of images capable of photographing on the basis of the vacant capacity information. Only when the number of images capable of photographing is greater than "one", the still image photographing process of the object and the recording process of the still image file to the magnetooptical disk 46 is carried out in response to the operation of the shutter button 56. In other words, when the number of images capable of photographing is "0", the operation of the shutter button 56 is invalidated.

Since the vacant capacity information is thus saved in the semiconductor memory having a faster access capability compared to that of a disk recording medium, it is possible to promptly determine whether or not the shutter button operation should be rendered validated when the battery power is applied It is noted that the disk information is saved in the flash memory 36 incorporated in the digital camera 10 in this embodiment. However, it may also be possible that the semiconductor memory saving the disk information is provided in the disk recording medium.

Furthermore, the magnetooptical disk is used as the disk recording medium in this embodiment. However, a detachable hard disk such as a Micro Drive provided by IBM Corporation may be used instead of the magnetooptical disk 46.

Still furthermore, a non-volatile flash memory is used as a semiconductor memory to save the disk information in this embodiment. However, the disk information may also be saved in a volatile semiconductor memory constantly backed-up by a back-up power source.

Still yet furthermore, the FAT scheme is used as a recording scheme to record the still image file in the magnetooptical disk 46 in this embodiment. However, a UDF (Universal Disc Format) scheme may instead be used.

Furthermore, a CCD imager is used to photograph an object in this embodiment, a CMOS imager may instead be used.

Still furthermore, descriptions are made by using a digital camera in this embodiment. The disk device of the present invention may be adapted to a standing-type disk recorder Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk apparatus which records a desired signal to a disk recording medium, comprising:
    an attacher for detachably attaching said disk recording medium;
    a first changer for changing to a power-on state when said disk recording medium is attached in a power-off state;
    a detecter for detecting vacant capacity information showing a vacant capacity of said disk recording medium when changing to said power-on state by said first changer;
    a saver for saving said vacant capacity information detected by said detecter in a semiconductor memory; and
    a controller for controlling a fetching of said desired signal on the basis of said vacant capacity information saved in said semiconductor memory.

2. A disk apparatus according to claim 1, further comprising:
    a second changer for changing from said power-off state to said power-on state in response to an instruction of a power supply; and
    an activater for activating said controller when changing to said power-on state by said second changer.

3. A disk apparatus according to claim 1, further comprising a fetcher for fetching said desired signal in response to a fetching instruction, wherein said controller includes an invalidater for invalidating said fetching instruction on the basis of said vacant capacity information.

4. A disk apparatus according to claim 3, wherein said desired signal is an image signal in which maximum size is determined in advance, said invalidater invalidates said fetching instruction when a vacant capacity shown by said vacant capacity information is less than said maximum size.

5. A disk apparatus according to claim 1, further comprising a third changer for changing from said power-off state to said power-on state after said vacant capacity information is saved in said semiconductor memory.

6. A disk apparatus according to claim 1, wherein said semiconductor is non-volatile.

7. A recording method which records a desired signal to a detachable disk recording medium, comprising steps of:
    (a) changing to a power-on state when said disk recording medium is attached in a power-off state;
    (b) detecting vacant capacity information showing a vacant capacity of said disk recording medium when changing to said power-on state in said step (a);
    (c) saving said vacant capacity information detected in said step (b) in a semiconductor memory; and
    (d) controlling a fetching of said desired signal on the basis of said vacant capacity information saved in said semiconductor memory.

8. A disk apparatus, comprising:
    a detector for detecting a vacant capacity value of a disk recording medium in response to an attaching operation of said disk recording medium;
    a saver for saving the vacant capacity value detected by said detector into a semiconductor memory;
    a fetcher for fetching designated information in response to a fetching operation when the vacant capacity value saved in said semiconductor memory exceeds a threshold value;
    a writer for writing the designated information fetched by said fetcher into an internal memory, and
    a record for recording the designated information stored in said internal memory into said disk recording medium, wherein said detector accepts the attaching operation during a time period from a power interrupting operation timing to a power inputting operation timing, said fetcher accepts the fetching operation during a time period from the power inputting operating timing to the next power interrupting operation timing, and the attaching operation, the fetching operation, a power inputting operation and a power interrupting operation are independent from each other.

9. A disk apparatus according to claim 8, wherein said disk recording medium is a magneto optical disk, and said recorder includes an irradiator for irradiating a laser beam to said magneto optical disk.

10. A disk apparatus according to claim 9, further comprising an adjustor for adjusting laser power of said irradiator in parallel with a fetching process of said fetcher.

11. A disk apparatus according to claim 10, wherein said semiconductor memory further saves an optimal laser power value of said magneto optical disk, and said adjustor carries out an adjusting process based on the optimal laser power value saved in said semiconductor memory.

12. A disk apparatus according to claim 8, further comprising a determiner for determining, after a fetching process of said fetcher, whether or not said disk recording medium is in a recordable state, wherein said recorder carries out a recording process when a determination result of said determiner is affirmative.

13. A disk apparatus according to claim 8, wherein said detector carries out a detecting process basd on a back-up-power source, and said fetcher carries out a fetching process based on a main power source.

14. A disk apparatus according to claim 8, further comprising:
    a determiner for determining whether or not a detecting process of said detector is completed; and
    an acceptor for accepting a power inputting operation when a determination result of said determiner is affirmative.

15. A disk recording method, comprising the steps of:
    (a) detecting a vacant capacity value of a disk recording medium in response to an attaching operation of said disk recording medium;
    (b) saving the vacant capacity detected by said step (a) into a semiconductor memory;
    (c) fetching designated information in response to a fetching operation when the vacant capacity value saved in said semiconductor memory exceeds a threshold value;

(d) writing the designated information fetched by said step (c) into an internal memory; and (e) recording the designated information stored in said internal memory into said disk recording medium, wherein said step (a) accepts theattaching operation during a time period from a power interrupting operation timing to a power inputting operation timing, said step (c) accepts the fetching operation during a time period from the power inputting operation timing to the next power interrupting operation timing, and the attaching operation, the fetching operation, a power inputting operation and a power interrupting operation are independent from each other.

16. A disk recording method according to claim 15, further comprising the steps of:

(f) determining whether or not a detecting process of said step (a) is completed, and (g) accepting a power inputting opreation when a determination result of said step (f) is affirmative.

* * * * *